United States Patent
Mader

(10) Patent No.: US 9,242,828 B2
(45) Date of Patent: Jan. 26, 2016

(54) METHOD AND APPARATUS FOR HANDLING SHEET BLANKS

(75) Inventor: Leopold Mader, Neuhofen/Ybbs (AT)

(73) Assignee: LISEC Austria GmbH, Seitenstetten (AT)

( * ) Notice: Subject to any disclaimer, the term of this patent is extended or adjusted under 35 U.S.C. 154(b) by 0 days.

(21) Appl. No.: 13/697,061

(22) PCT Filed: Jan. 3, 2012

(86) PCT No.: PCT/AT2012/000001
§ 371 (c)(1),
(2), (4) Date: Jan. 8, 2013

(87) PCT Pub. No.: WO2012/112999
PCT Pub. Date: Aug. 30, 2012

(65) Prior Publication Data
US 2013/0099047 A1    Apr. 25, 2013

(30) Foreign Application Priority Data

Feb. 21, 2011 (AT) .................................. A 226/2011

(51) Int. Cl.
*B65H 3/12* (2006.01)
*B65H 39/14* (2006.01)
(Continued)

(52) U.S. Cl.
CPC .......... *B65H 39/14* (2013.01); *B32B 17/10954* (2013.01); *B32B 38/1858* (2013.01); *B65H 18/04* (2013.01); *B65H 27/00* (2013.01); *B65H 29/008* (2013.01); *B65H 29/243* (2013.01);
(Continued)

(58) Field of Classification Search
CPC ................ B65H 2701/1742; B65H 2701/1752
USPC ................................ 271/90, 95, 96, 102, 106
See application file for complete search history.

(56) References Cited

U.S. PATENT DOCUMENTS

| 4,168,829 A * | 9/1979 | Wilson et al. ................. 271/108 |
| 6,416,049 B1 * | 7/2002 | Mitzel ............................. 271/96 |

(Continued)

FOREIGN PATENT DOCUMENTS

| CN | 1678510 A | 10/2005 |
| DE | 19 27 936 | 12/1970 |

(Continued)

OTHER PUBLICATIONS

International Search Report dated May 7, 2012, corresponding to PCT/AT2012/000001.

(Continued)

*Primary Examiner* — Howard Sanders
(74) *Attorney, Agent, or Firm* — Young & Thompson

(57) ABSTRACT

To take blanks of sheets for producing laminated glass, from a cutting table, an adjustable takeoff roller onto which the sheet blanks are wound is used. To fix the beginning of the sheet blank to be taken off to the takeoff roller, openings for applying negative pressure are provided in the lateral surface of the takeoff roller. When a sheet blank is taken from the cutting table, the takeoff roller is brought into position at the beginning of the sheet blank to be taken off, the blank is fixed to the takeoff roller and the takeoff roller is then moved along the cutting table while rotating about its own axis, and so the sheet blank is wound up around the lateral surface of the takeoff roller. For laying down the sheet blank onto a glass pane during the production of laminated glass, a correspondingly reversed procedure may be used.

2 Claims, 3 Drawing Sheets

(51) Int. Cl.
*B32B 38/18* (2006.01)
*B65H 27/00* (2006.01)
*B65H 29/24* (2006.01)
*B65H 29/00* (2006.01)
*B65H 18/04* (2006.01)
*B65H 29/56* (2006.01)
*B32B 17/10* (2006.01)

(52) U.S. Cl.
CPC ...... *B65H 29/56* (2013.01); *B65H 2301/41426* (2013.01); *B65H 2301/41427* (2013.01); *B65H 2406/332* (2013.01); *B65H 2406/334* (2013.01); *B65H 2406/3314* (2013.01); *B65H 2406/362* (2013.01); *B65H 2406/3632* (2013.01); *B65H 2701/1742* (2013.01); *B65H 2701/1752* (2013.01)

(56) References Cited

U.S. PATENT DOCUMENTS

2004/0113351 A1* 6/2004 Bouchal et al. ............... 271/106
2008/0011412 A1* 1/2008 Tsujimoto et al. ............ 156/193
2010/0206485 A1* 8/2010 Kodera ......................... 156/358

FOREIGN PATENT DOCUMENTS

| | | |
|---|---|---|
| DE | 20 2010 008015 | 10/2010 |
| EP | 0 172 143 | 2/1986 |
| EP | 0 387 632 | 9/1990 |
| EP | 1 564 168 | 8/2005 |
| JP | 2010173843 A | 8/2010 |
| WO | 2004/021485 A2 | 3/2004 |

OTHER PUBLICATIONS

Chinese Office Action, dated Mar. 24, 2015, from corresponding Chinese patent application.

* cited by examiner

METHOD AND APPARATUS FOR HANDLING SHEET BLANKS

The invention relates to a method and an apparatus for handling sheet blanks. In particular, in the invention, the handling of sheet blanks, which are used in the production of laminated glass, is considered.

Up until now, larger formats of such sheets were divided on cutting tables, which are designed similar to glass-cutting tables, to obtain the desired sheet blanks. Lifting the sheet blanks from the cutting table was done using vacuum plates.

Taking off the sheet blanks using vacuum plates and putting the sheet blanks in place on glass panes is problematic, since completely uniform and unwrinkled lifting is as difficult to achieve as the uniform and unwrinkled placement of the sheet blanks on glass panes.

The object of the invention is to make available a method and an apparatus of the above-mentioned type that allow the taking off and placing sheet blanks at low cost, but more precisely and flawlessly.

This object is achieved according to the invention with a method that has the features of claim 1.

Insofar as the apparatus according to the invention is affected, the underlying object of the invention is achieved with the features of the independent device claim.

Preferred and advantageous configurations of the method according to the invention and the apparatus according to the invention are subjects of the subclaims.

Since in the method according to the invention and with the apparatus according to the invention, the sheet blanks are taken off of the cutting table (lifted) by winding up onto a (takeoff) roller (roller or drum), no problems arise, and a uniform and unwrinkled takeoff is achieved. Also, the placement of the sheet blanks on the surface, to which they are to be applied, e.g., on the surface of a glass pane in the course of the production of laminated glass, can be done easily and without wrinkles by rolling off the roller.

In this case, within the scope of the invention, it is provided in a preferred embodiment that the effective width of the roller, which preferably has a width that corresponds to the entire width of the sheet-cutting table, is set to a measurement that corresponds to the width of the sheet blank that is be taken off/placed.

Fastening one edge of the sheet blank to the roller for taking off the sheet blank from the cutting table can be carried out as desired. It is especially advantageous within the scope of the invention when the edge of the sheet blank that is to be connected to the takeoff roller is fixed to the roller by underpressure.

To this end, a row of openings to which underpressure can be applied can be provided in the peripheral wall (in the jacket) of the (hollow) roller. This row of openings extends in particular parallel to the axis of the roller.

The invention also calls for slides or the like to be provided inside the roller, which releases only the openings for coating with underpressure that correspond to the width of the sheet blank to be accommodated in the area of the sheet blank that is to be picked up and first fixed to the takeoff roller.

Other details and features of the invention will emerge from the description below of preferred sample embodiments based on the drawings. Here:

FIG. 1 diagrammatically shows a sheet-cutting table, and

Figure 1:
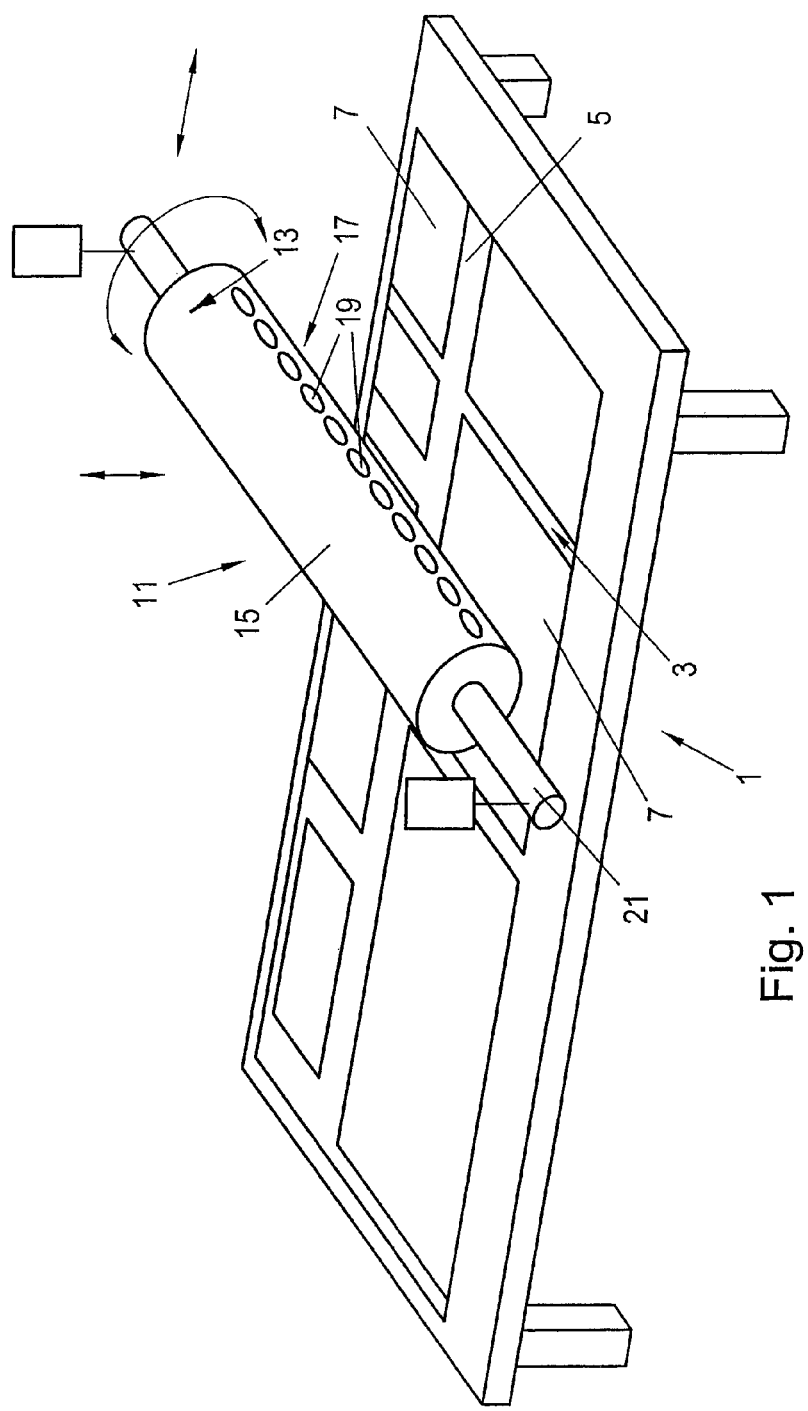

It can be seen from FIG. 1 that a sheet 3 placed on a sheet-cutting table 1 has been divided into sheet blanks 7 according to a division diagram optimized using a computer program with scraps 5 remaining. To this end, the sheet was placed on the sheet-cutting table 1 and divided by a tool (not shown).

To take sheet blanks 7 off the sheet-cutting table 1, an apparatus 11 is provided, which has a takeoff roller 13, which has a width that essentially corresponds to the width of the sheet-cutting table 1.

The takeoff roller 13 is brought into position on an edge (edge area) of a sheet blank 7 that is to be taken off by being adjusted parallel to the table surface and being lowered perpendicular to the table surface. As soon as this has taken place, the takeoff roller 13 is connected to the (crosswise) edge of the sheet blank 7 that lies below the takeoff roller 13 and that is taken off the sheet-cutting table 1.

To this end, in the sample embodiment shown, an axis-parallel row 17 of openings 19 is provided in the jacket 15 of the takeoff roller 13, to which openings underpressure can be applied. The inside of the hollow takeoff roller 13 can be connected to a source of underpressure, for example via its shaft 21 that is designed hollow.

Figure 2:
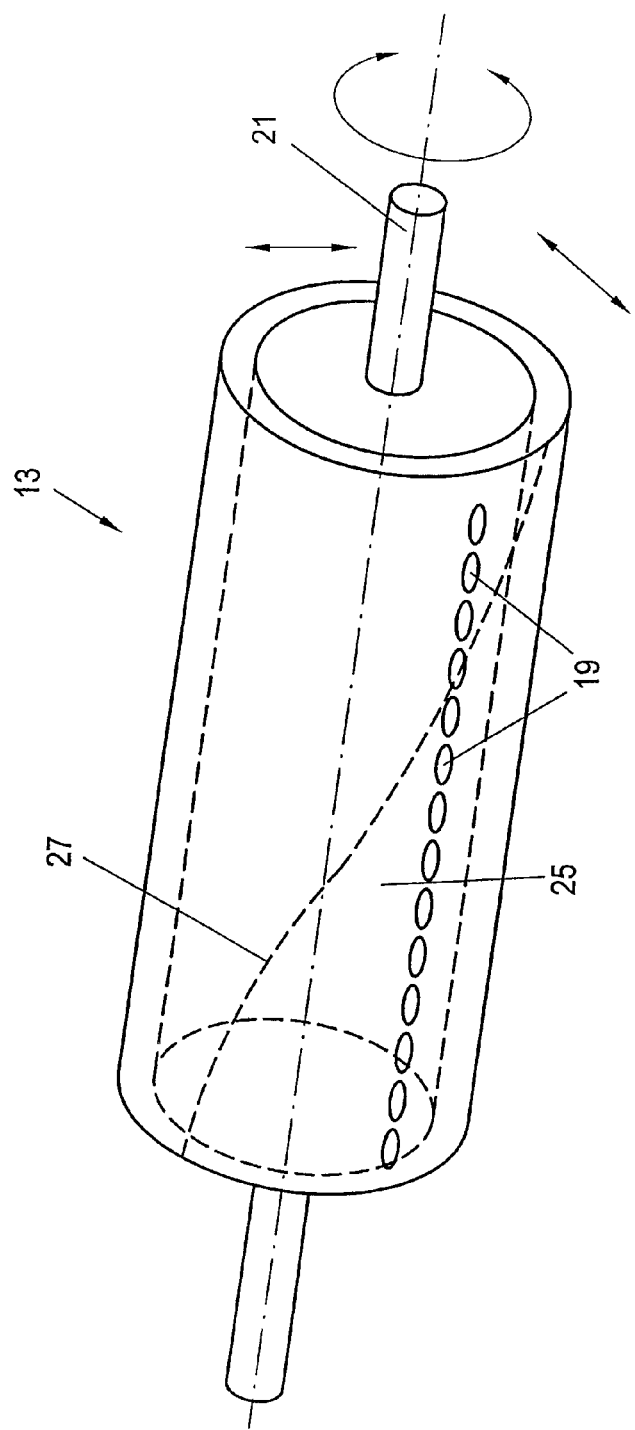
FIG. 2 shows a takeoff roller that is schematized to a large extent.

To match the effective width of the takeoff roller 13, i.e., the length of the area of the row 17 of openings 19 to which underpressure is applied, to the width of the sheet blanks 7 to be taken off, a slide 25, which is in sliding contact on the inside surface of the jacket 15 of the takeoff roller 13 and can be adjusted relative to the jacket 15 (by a drive, not shown) by rotation, is provided in the sample embodiment, shown in FIG. 2, inside the takeoff roller 13. Thus, it can be determined to which openings 19 underpressure can be applied and to which openings 19 underpressure cannot be applied. This allows the effective width of the takeoff roller 13 to be matched to the width of the sheet blank 7.

The slide 25 can be, for example, a tubular slide element that has an oblique edge 27, so that by rotating the slide 25 relative to the jacket 15 of the takeoff roller 13, in each case only the necessary number of openings 19 of the row 17 is released and underpressure is applied thereto.

Advantageously, in the method according to the invention for taking off sheet blanks 7 from the sheet-cutting table 1, the procedure is such that the takeoff roller 13, after it has been connected to the edge of the sheet blank 7 to be taken off, e.g., this edge has been drawn in, is lifted somewhat from the sheet-cutting table 1, in such a way that the sheet blank 7 is wound under tension on the takeoff roller 13, by the latter being rotated, whereby the takeoff roller 13 is moved parallel to the table surface of the sheet-cutting table 1 via the sheet blank 7 to be taken off.

As an alternative, there is the possibility of also making available a set of takeoff rollers 13 of different widths instead of a takeoff roller 13 with an adjustable effective width, which takeoff rollers 13 in each case have a row 17 of openings 19 to which underpressure can be applied, whereby underpressure can be applied to all openings 19 over the entire length of the takeoff rollers 13.

When sheets or sheet blanks, which are sticky at room temperature, are to be worked with the method according to the invention or the apparatus according to the invention, it can be provided that the sheet-cutting table 1 is arranged in a climatic chamber or is provided simply with a cooling of its support (table) surface in order to keep the sheet 3 at a temperature, e.g., to cool it, at which it is no longer sticky.

In another embodiment, to adjust the effective width of the takeoff roller 13, which has an axis-parallel row 17 of openings 19 to which underpressure can be applied, a pipe is arranged to rotate inside the takeoff roller 13, and said pipe has axis-parallel rows of punched holes or slots of different lengths. By rotating the inside pipe, in each case the row of punched holes or the slot of the inside pipe with openings 19 in the jacket 15 of the takeoff roller 13 can be oriented in an aligned manner, whose length corresponds to the width of the sheet blank to be taken off, so that in each case, underpressure is applied to the number of openings 19 in the jacket 15 of the takeoff roller 13 with the desired width, i.e., the effective width of the takeoff roller 13 is adjusted.

In addition, the adjustment drive of the takeoff roller 13 can be set up in such a way that the takeoff roller 13 can be adjusted in the direction of its axis relative (crosswise) to the sheet-cutting table 1 in order to orient it opposite the sheet blanks 7 to be taken off.

In summary, an embodiment of the invention can be described as follows:

To take blanks 7 of sheets, as they are used for the production of laminated glass, off of a cutting table 1, a takeoff roller 13 that can be adjusted above the cutting table 1 and on which the sheet blanks 7 are wound is used. To secure the beginning of the sheet blank 7 to be taken off on the takeoff roller 13, openings 19, to which underpressure can be applied, are provided in the jacket 15 of the takeoff roller 13. When taking off a sheet blank 7 from a cutting table 1, the takeoff roller 13 is brought into position at the beginning of the sheet blank 7 to be taken off, the blank 7 is secured to the takeoff roller 13, and the takeoff roller 13 then moves along the cutting table 1 while rotating around its own axis, so that the sheet blank 7 is wound around the jacket 15 of the takeoff roller 13.

Figure 3:
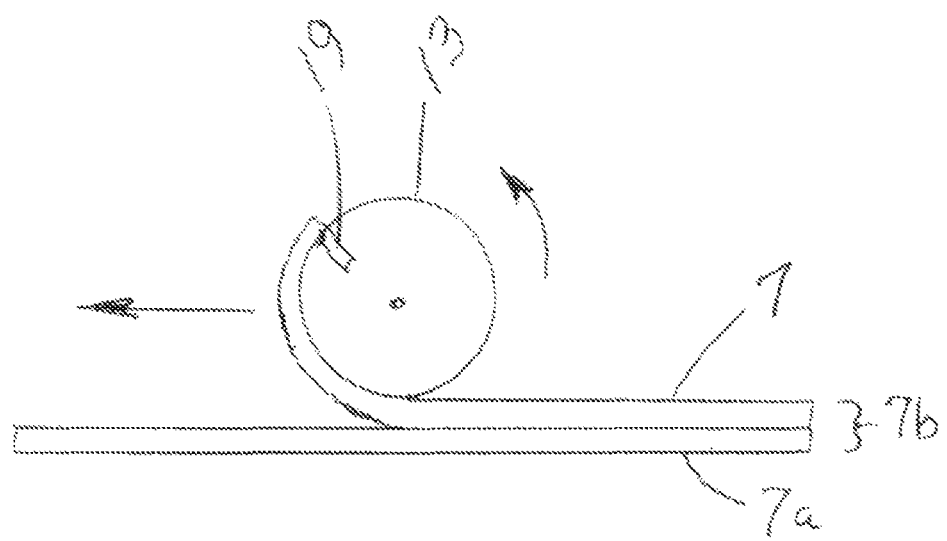
FIG. 3 shows the takeoff roller laying down the rolled-up sheet blank on a glass pane.

With reference now to FIG. 3, for laying down the sheet blank 7 on a glass pane 7*a* during the production of laminated glass 7*b*, a correspondingly reversed mode of operation can be used.

The invention claimed is:

1. A method for taking a sheet blank from a sheet divided into a plurality of sheet blanks used for production of laminated glass, from a cutting table, the method comprising:

dividing, on a cutting table, a sheet used for production of laminated glass into a plurality of sheet blanks;

bringing a takeoff roller into position over the cutting table at an edge of a sheet blank to be taken from among the plurality of sheet blanks on the cutting table;

holding the edge of the sheet blank on the takeoff roller by underpressure, wherein the takeoff roller includes openings parallel to an axis of the takeoff roller through which the underpressure is applied;

opening a selected subset of the openings so that a lateral extent of the selected subset of openings corresponds to a lateral extent of the sheet blank;

removing the sheet blank from the surface of the cutting table by rolling up the sheet blank onto the takeoff roller;

moving the takeoff roller perpendicular to the plane of the cutting table and then moving the takeoff roller parallel to the plane of the cutting table while rotating around its own axis to roll up the sheet blank onto the takeoff roller; and moving the takeoff roller with the rolled up blank sheet thereon over a glass pane and unrolling the rolled up blank sheet from the takeoff roller onto the glass pane.

2. The method according to claim 1, further comprising lifting the takeoff roller from the sheet-cutting table at the beginning of removal of the sheet blank.

* * * * *